US011942010B2

(12) United States Patent
Ying

(10) Patent No.: US 11,942,010 B2
(45) Date of Patent: Mar. 26, 2024

(54) DRIVING METHOD OF DISPLAY PANEL AND DISPLAY DEVICE

(71) Applicant: Shenzhen China Star Optoelectronics Semiconductor Display Technology Co., Ltd., Shenzhen (CN)

(72) Inventor: Jianjian Ying, Shenzhen (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 0 days.

(21) Appl. No.: 16/972,593

(22) PCT Filed: Nov. 19, 2020

(86) PCT No.: PCT/CN2020/129980

§ 371 (c)(1),
(2) Date: Dec. 6, 2020

(87) PCT Pub. No.: WO2022/095126

PCT Pub. Date: May 12, 2022

(65) Prior Publication Data

US 2023/0267865 A1 Aug. 24, 2023

(30) Foreign Application Priority Data

Nov. 9, 2020 (CN) ........................ 202011236861.1

(51) Int. Cl.
*G09G 3/20* (2006.01)

(52) U.S. Cl.
CPC ....... *G09G 3/20* (2013.01); *G09G 2300/0852* (2013.01); *G09G 2310/0202* (2013.01); *G09G 2320/0247* (2013.01); *G09G 2320/08* (2013.01)

(58) Field of Classification Search
CPC .. G09G 5/00; G09G 3/20; G09G 3/36; G09G 2300/0852; G09G 2310/0202; G09G 2320/0247; G09G 2320/08
See application file for complete search history.

(56) References Cited

U.S. PATENT DOCUMENTS

| | | | | |
|---|---|---|---|---|
| 9,858,854 | B2 | 1/2018 | Seo et al. | |
| 2017/0069256 | A1* | 3/2017 | Seo | G09G 3/3648 |
| 2018/0122327 | A1* | 5/2018 | Kim | G09G 3/3688 |

FOREIGN PATENT DOCUMENTS

| | | | |
|---|---|---|---|
| CN | 102930839 | A | 2/2013 |
| CN | 105654890 | A | 6/2016 |
| CN | 110010091 | A | 7/2019 |
| CN | 111462704 | A | 7/2020 |

* cited by examiner

*Primary Examiner* — Michael A Faragalla
(74) *Attorney, Agent, or Firm* — Nathan & Associates; Menachem Nathan

(57) ABSTRACT

A driving method of a display panel and a display device are provided. During a display period of a frame of image, when the display panel performs frequency switching, a data voltage of data signal line of the display panel or a switching voltage of pixels of the display panel is changed synchronously with the frequency switching of a displayed image, effectively alleviating problems of flickering and unsatisfactory display quality when switching between different signal frequencies, and improving a performance of the display panel.

17 Claims, 2 Drawing Sheets

DRIVING METHOD OF DISPLAY PANEL AND DISPLAY DEVICE

FIELD OF INVENTION

The present disclosure relates to the technical field of display panels, and in particular, to a driving method of a display panel and a display device.

BACKGROUND OF INVENTION

Among present display panels, liquid crystal display (LCD) panels have become a mainstream due to their advantages such as low power consumption, high display quality, and wide application.

In recent years, people have higher and higher requirements on display panel performance, especially for display panels used in the gaming industry. For gaming displays, display screens provide richer content for gaming images, and the display image refresh frequency is faster, in order to meet normal needs of users. However, in conventional art, display panels with high refresh rates generally use freesync technology. In a freesync driving technology, when the display panels transmit signals of different frequencies, a same charging time is used to transmit data signals in a signal region. High and low frequencies are only different in a duration corresponding to a blank period. Although a charging time of pixels is same at the high and low frequencies, a difference between corresponding blank periods in different time periods is larger. For example, when the frequencies are 240 Hz and 60 Hz, there is a big difference in an electrical leakage time between the two corresponding blank periods. Time of the corresponding blank period at 60 Hz is equivalent to about 70 times that of 240 Hz, which leads to brightness differences of the display panels when displaying or when an image is switched. During use by an end consumer, the displayed image is prone to flicker, thereby reducing display effect of the display panels.

Therefore, it is necessary to propose solutions to the problems in the conventional art.

Technical Problem

To sum up, in the existing high refresh screens of the display panels, the displayed images are prone to brightness differences during displaying, and when switching between the high and low frequencies, a switched image is prone to serious flickering problems. This further affects the display effect of the display panels and reduces the user experience.

SUMMARY OF INVENTION

Technical Solutions

In order to solve the above-mentioned problems, the embodiments of the present disclosure provide a driving method of a display panel and the display panel thereof, so as to solve the problem that a conventional display panel displays images and when displayed images are switched, the displayed images are prone to flicker, and a display effect of the display panel is not ideal.

Embodiments of the present disclosure provide a flexible display panel and a display device to improve a bending performance of the flexible display panel and to improve an overall performance of the flexible display panel.

To solve the above technical problems, the technical solutions according to the embodiments of the present disclosure are as follows.

A first aspect of the embodiments of the present disclosure provides a driving method of a display panel, the display panel including:

- a plurality of scan lines;
- a plurality of data lines, wherein the data lines and the scan lines are disposed in an array in a display region of the display panel;
- a gate driving circuit electrically connected to the scan lines correspondingly, and disposed in a non-display region of the display panel; and
- a plurality of pixels disposed at intersections of the scan lines and the data lines;
- wherein when the display panel displays images, during a display period of a frame of image, when a displayed image of the display panel is subjected to frequency switching, a data voltage of the data lines or a switching voltage of the pixels is changed synchronously with the frequency switching of the displayed image; and
- wherein during the display period of the frame of image, the display period of the frame of image includes a first stage and a second stage, the first stage and the second stage are alternated in sequence, and a duration of the first stage is different from a duration of the second stage.

According to an embodiment of the present disclosure, the first stage is a normal display stage of the display panel, the second stage is a blank period of the display panel, and the display panel does not display during the blank period.

According to an embodiment of the present disclosure, when a frequency of the displayed image is a high frequency or a low frequency, the duration of the second stage corresponding to the high frequency signal is less than the duration of the second stage corresponding to the low frequency signal.

According to an embodiment of the present disclosure, when the display panel is switched from a low frequency signal to a high frequency signal, a value of the data voltage is increased in the second stage, and the value of the data voltage in the second stage is greater than corresponding value of the data voltage in the first stage, and wherein when the display panel is switched from the high frequency signal to the low frequency signal, the value of the data voltage is reduced in the second stage, and the value of the data voltage in the second stage is less than the corresponding value of the data voltage in the first stage.

According to an embodiment of the present disclosure, when the display panel is switched from a low frequency signal to a high frequency signal in the second stage, a minimum voltage at which the pixels are turned on is Vss1, a switching voltage of the pixels corresponding to the low frequency signal is Vss, the switching voltage of the pixels corresponding to the high frequency signal is Vss3, the switching voltage Vss of the pixels corresponding to the low frequency signal is set to the minimum voltage Vss1 at which the pixels are turned on, and the switching voltage Vss3 of the pixels corresponding to the high frequency signal is set to be greater than the minimum voltage Vss1 at which the pixels are turned on.

According to an embodiment of the present disclosure, when the displayed image of the display panel is subjected to the frequency switching, a value of the data voltage in the second stage of a low frequency signal is set to be greater than a corresponding value of data voltage in the first stage, a value of the switching voltage Vss of the pixels in the second stage of the low frequency signal is set to be greater than a minimum voltage Vss1 at which the pixels are turned on; at the same time, a value of the data voltage in the second stage of a high frequency signal is set to be less than a corresponding value of data voltage in the first stage, a value of the switching voltage Vss of the pixels in the second stage of the high frequency signal is set to be the minimum voltage Vss1 at which the pixels are turned on, the minimum voltage for turning on the pixels is Vss1, and the value of the switching voltage of the pixels in the second stage is Vss.

According to an embodiment of the present disclosure, a frequency of a scanning signal applied to each of the scan lines ranges from 10 Hz to 240 Hz.

A second aspect of the embodiments of the present disclosure provides a driving method of a display panel, wherein the display panel includes:

a plurality of scan lines;

a plurality of data lines, wherein the data lines and the scan lines are disposed in an array in a display region of the display panel;

a gate driving circuit electrically connected to the scan lines correspondingly, and disposed in a non-display region of the display panel; and a plurality of pixels disposed at intersections of each of the scan lines and each of the data lines, respectively;

wherein when the display panel displays images, during a display period of displaying one of the images, when a displayed image of the display panel is subjected to frequency switching, a data voltage of the data lines or a switching voltage of the pixels is changed synchronously with the frequency switching of the displayed image.

According to an embodiment of the present disclosure, during the display period of the frame of image, the display period of the frame of image includes a first stage and a second stage, the first stage and the second stage are alternated in sequence.

According to an embodiment of the present disclosure, the first stage is a normal display stage of the display panel, the second stage is a blank period of the display panel, and the display panel does not display during the blank period.

According to an embodiment of the present disclosure, a duration of the first stage is different from a duration of the second stage.

According to an embodiment of the present disclosure, when a frequency of the displayed image is a high frequency or a low frequency, the duration of the second stage corresponding to the high frequency signal is less than the duration of the second stage corresponding to the low frequency signal.

According to an embodiment of the present disclosure, when the display panel is switched from a low frequency signal to a high frequency signal, a value of the data voltage is increased in the second stage, and the value of the data voltage in the second stage is greater than corresponding value of data voltage in the first stage, and wherein when the display panel is switched from the high frequency signal to the low frequency signal, the value of the data voltage is reduced in the second stage, and the value of the data voltage in the second stage is less than the corresponding value of the data voltage in the first stage.

According to an embodiment of the present disclosure, when the display panel is switched from a low frequency signal to a high frequency signal in the second stage, a minimum voltage at which the pixels are turned on is Vss1, a switching voltage of the pixels corresponding to the low frequency signal is Vss, the switching voltage of the pixels corresponding to the high frequency signal is Vss3, the switching voltage Vss of the pixels corresponding to the low frequency signal is set to the minimum voltage Vss1 at which the pixels are turned on, and the switching voltage Vss3 of the pixels corresponding to the high frequency signal is set to be greater than the minimum voltage Vss1 at which the pixels are turned on.

According to an embodiment of the present disclosure, when the displayed image of the display panel is subjected to the frequency switching, a value of the data voltage in the second stage of a low frequency signal is set to be greater than a corresponding value of data voltage in the first stage, a value of the switching voltage Vss of the pixels in the second stage of the low frequency signal is set to be greater than a minimum voltage Vss1 at which the pixels are turned on; at the same time, a value of the data voltage in the second stage of a high frequency signal is set to be less than a corresponding value of data voltage in the first stage, a value of the switching voltage Vss of the pixels in the second stage of the high frequency signal is set to be the minimum voltage Vss1 at which the pixels are turned on, the minimum voltage for turning on the pixels is Vss1, and the value of the switching voltage of the pixels in the second stage is Vss.

According to an embodiment of the present disclosure, a frequency of a scanning signal applied to each of the scan lines ranges from 10 Hz to 240 Hz.

A third aspect of the embodiments of the present disclosure further provides a display device, when driving the display device, a driving method of a display panel provided by the embodiments of the present disclosure is configured to drive the display device.

According to an embodiment of the present disclosure, a frequency of a scanning signal applied to each of the scan lines ranges from 10 Hz to 240 Hz.

According to an embodiment of the present disclosure, the switching voltage of the pixels is set between −25V and 25V.

According to an embodiment of the present disclosure, the display device includes a flat display device and a mobile display device.

Beneficial Effect

In summary, the beneficial effects of the embodiments of the present disclosure are as follows.

The embodiments of the present disclosure provide a driving method of a display panel and a display device. When the display panel displays images with different frequencies, for example, when switching from a low frequency to a high frequency, by adjusting the data voltage of the data lines or adjusting the switching voltages of the pixels in the display panel, the data voltage of the data lines or the switching voltages of the pixels are changed synchronously with the change of frequency. Furthermore, it can effectively reduce problems of flickering on the displayed images, unsatisfactory display quality, and unsatisfactory display effect when switching between different signal frequencies, thereby improving a performance of the display panel.

DETAILED DESCRIPTION OF EMBODIMENTS

The description of the following embodiments refers to the attached drawings to illustrate specific embodiments that the present disclosure can be implemented.

Embodiments of the present disclosure provide a driving method of a display panel and a display device. In the driving method of the display panel in the embodiments of the present disclosure, when the display panel switches displayed images with high and low frequency signals, by adjusting a data voltage of data lines or adjusting a switching voltage of pixels in the display panel, a problem of flickering when the display panel switches at different frequencies is reduced.

Figure 1:
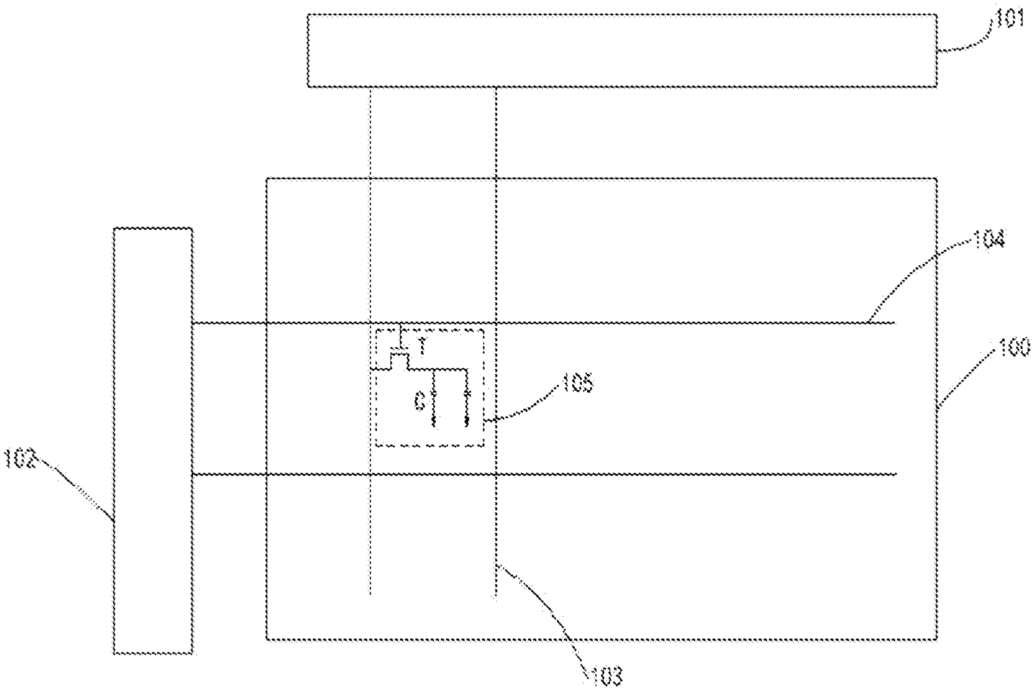
FIG. 1 is a schematic structural diagram of a driving circuit of a display device according to an embodiment of the present disclosure.

As shown in FIG. 1, FIG. 1 is a schematic structural diagram of a driving circuit of a display device according to an embodiment of the present disclosure. The display device includes a display panel 100, a data driving circuit unit 101, and a gate driving circuit 102. Wherein, the data driving circuit unit 101 and the gate driving circuit 102 are both disposed in a non-display region of the display panel.

Furthermore, the display panel 100 further includes a plurality of data lines 103 and a plurality of scan lines 104, the data lines 103 and the scan lines 104 are disposed in an array in a display region of the display panel.

At the same time, the scan lines 104 are also correspondingly connected to the gate driving circuit 102 of the display panel 100, the data lines 103 are correspondingly connected to the data driving circuit unit 101 of the display panel 100, the gate driving circuit 102 is configured to provide scanning signals to the scan lines 104, and the data driving circuit unit 101 is configured to provide data signals to the data lines 103, thereby achieving a control of the display panel 100.

In the embodiment of the present disclosure, a plurality of pixels 105 are further disposed at intersections of the data lines 103 and the scan lines 104, and the data lines 103 and the scan lines 104 are configured to provide the data signals and the scanning signals to the pixels, respectively.

The display panel 100 displays images using data voltage provided by the data driving circuit unit 101 and gate scanning voltage provided by the gate driving circuit 102. Each of the pixels 105 further includes a thin film transistor T. The thin film transistor T is connected to one of the scan lines 104 and one of the data lines 103. Meanwhile, each of the pixels 105 also includes a plurality of capacitors C.

When a high level of the gate voltage of one of the scan lines 104 is applied to the thin film transistor T, the thin film transistor T is turned on, and a data voltage of one of the data lines 103 is transmitted to the capacitors C in each of the pixels 105 through the thin film transistor T to display a gray level.

In the present embodiment, the capacitors C further include a storage capacitor. Each of the pixels 105 also includes a pixel electrode, a common electrode, and a liquid crystal layer disposed between the pixel electrode and the common electrode. The storage capacitor maintains a voltage of the pixel electrode during a frame interval.

Furthermore, the display panel 100 can be driven at a high frequency and a low frequency to display images using the data voltage. When displaying an image with different frequencies, switching is required according to the frequencies used to display. Especially for gaming images, a corresponding frequency of the gaming images is refreshed faster, so the refresh frequency of each signal line must be quickly switched to ensure normal display of the display panel.

In the embodiment of the present disclosure, in order to prevent the display panel from flickering, when the display panel displays the images, during a display period of a frame of image, the data voltage of the data lines 103 or the switching voltage of the thin film transistors of the corresponding pixels 105 are adjusted, to make the scan voltage or the data voltage change synchronously with frequency switching of the displayed image to eliminate the problem of flickering.

Figure 2:
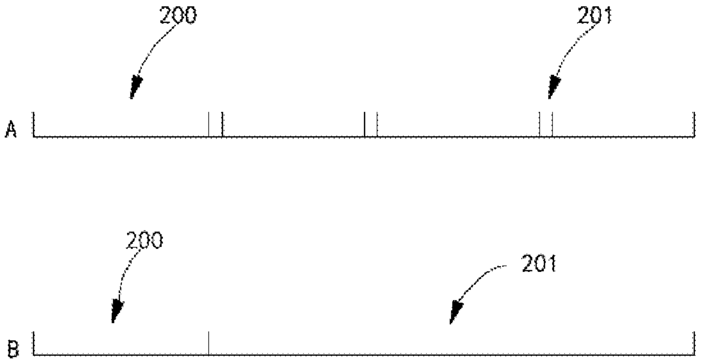
FIG. 2 is a schematic diagram of voltages corresponding to different frequencies of an image according to an embodiment of the present disclosure.

Specifically, as shown in FIG. 2, FIG. 2 is a schematic diagram of voltages corresponding to different frequencies of an image according to an embodiment of the present disclosure. A signal frequency corresponding to signal A in FIG. 2 is 240 Hz, and the corresponding data voltage is V3. A signal frequency corresponding to signal B in FIG. 2 is 60 Hz, and the corresponding data voltage is V4. Since the signal A and the signal B have different frequencies, and a frequency of the signal A is greater than a frequency of the signal B, a signal frequency can be any frequency value, and can also be any frequency between 10 Hz and 240 Hz.

When the display panel receives the signal A and the signal B, a normal stage and a blank period are included during the display period of the frame of image.

The signal A in the embodiment of the present disclosure includes a first stage 200 and a second stage 201, the first stage 200 and the second stage 201 are alternated in sequence, and corresponding durations of the first stage 200 and the second stage 201 are different. The first stage 200 is a normal display stage of displaying the images, and the second stage 201 is the blank period of displaying the images, that is, in the second stage 201, the display panel does not display.

Since the frequency of the signal A is greater than the frequency of the signal B, the duration of the signal A corresponding to the second stage 201 is less than the duration of the signal B corresponding to the second stage 201.

Figure 3:
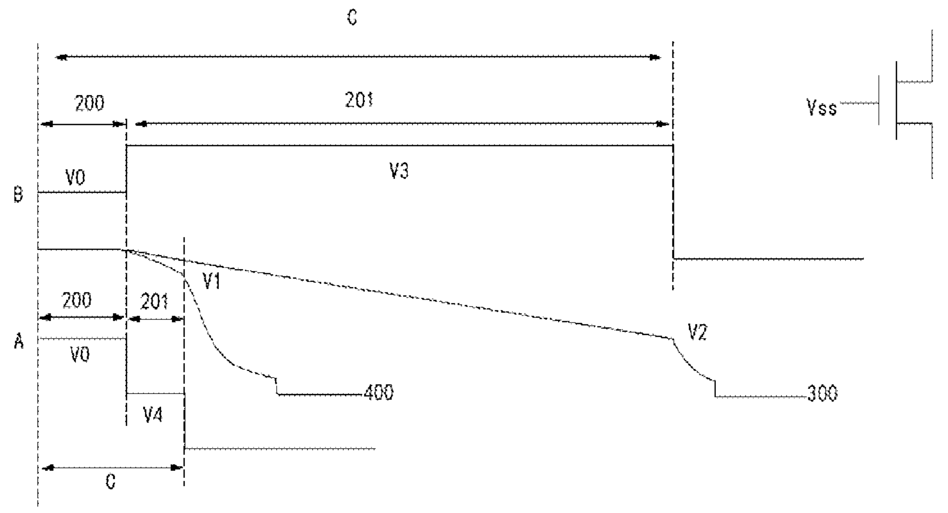
FIG. 3 is a schematic diagram of data voltage changes at different frequencies according to an embodiment of the present disclosure.

When the image is adjusted, as shown in FIG. 3, FIG. 3 is a schematic diagram of data voltage changes at different frequencies according to an embodiment of the present disclosure. The frequency switching of high and low is performed in the second stage of the display period. Specifically, when the display panel is switched from the low frequency signal to the high frequency signal, in the embodiment of the present disclosure, switching from a signal frequency of 60 Hz to a frequency of 240 Hz is taken as an example for description.

Taking the display period C as an example, it includes a first time period 200 and a second time period 201 respectively. Moreover, the frequency corresponding to sequence diagram A is 240 Hz, and the frequency corresponding to sequence diagram B is 60 Hz. From the sequence diagram corresponding to each frequency, it can be seen that the duration of the both in the first time period 200 is same, that is, the normal display time is the same. However, the duration of the both in the second time period 201 is different. The duration of the second time period 201 corresponding to the frequency signal of 60 Hz is greater than the duration of the second time period 201 corresponding to the frequency signal of 240 Hz.

Furthermore, a curve 300 is a schematic diagram of variation of a scanning signal voltage corresponding to the signal frequency of 60 Hz, and a curve 400 is a schematic diagram of variation of a scanning signal voltage corresponding to the signal frequency of 240 Hz. When the signal frequency is switched in the second stage 201, the corresponding scanning signal voltage changes accordingly. In the present embodiment, by changing the corresponding data voltage or the switching voltage of the pixels in the second time period 201, it is effective in solving the problem of flickering.

Specifically, when the signal frequency is switched from low frequency to high frequency, such as a mutual conversion from 60 Hz to 240 Hz, a value of the data voltage of the data signal line corresponding to the pixel unit is increased. Preferably, in the blank period 201, increasing the data voltage of the data signal line corresponding to the low frequency signal, so that the value of the data voltage is greater than the value of the corresponding data voltage in the first stage 200, that is, the value of the data voltage is increased from V0 to V3.

At the same time, the data voltage of the data signal line corresponding to the high frequency signal is reduced, so that the value of the data voltage is less than the value of the corresponding data voltage in the first stage 200, that is, the value of the data voltage drops from V0 to V4. In this way, an effect of electrical leakage matching between the high and the low frequencies is achieved, and the problem of flickering when the display panel switches at different frequencies is reduced and eliminated.

The values of the data voltage V3 and V4 provided in the embodiments of the present disclosure can be adjusted according to a flickering effect of the panel during an actual displaying process. Furthermore, in a process of adjusting the value of the data voltage, the scan voltage at the corresponding high and low frequencies will also be different in the blank period 201. In the embodiment of the present disclosure, a voltage value V2 at an end of the blank period 201 corresponding to the curve 300 is a low frequency scan voltage value V2 of the display panel, and a voltage value V1 at the end of the blank period 201 corresponding to the curve 400 is a high frequency scan voltage value V1 of the display panel.

After the adjustment is completed, a difference between the corresponding scan voltage values V1 and V2 at high and low frequencies is small, thereby effectively improving the problem of image flickering.

Figure 4:
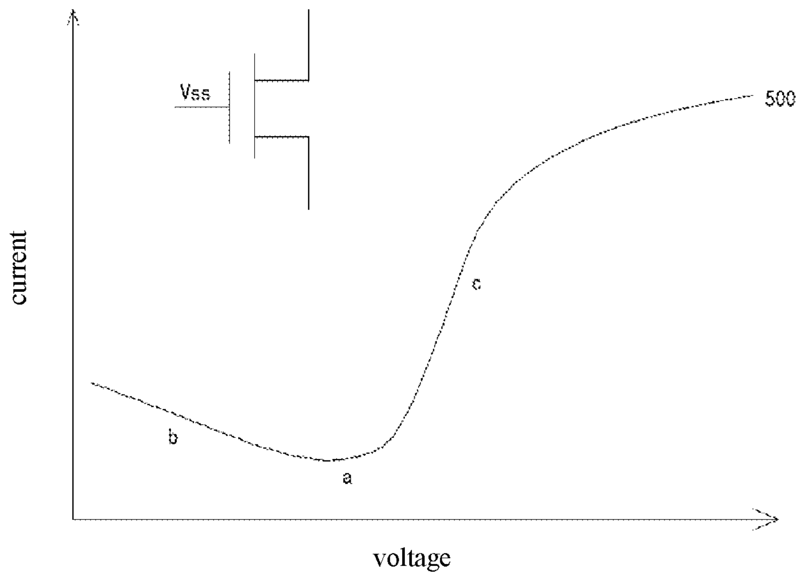
FIG. 4 is a schematic diagram of a variation curve of a switching voltage according to an embodiment of the present disclosure.

Furthermore, in the embodiment of the present disclosure, as shown in FIG. 4, FIG. 4 is a schematic diagram of a variation curve of the switching voltage according to an embodiment of the present disclosure. Preferably, in the embodiment of the present disclosure, when the display panel is switched between high and low frequencies, the switching voltage Vss corresponding to the pixels in the display panel can also be adjusted to reduce or eliminate the problem of image flickering of the display panel.

Specifically, on a curve of the switching voltage 500, point a corresponds to a minimum voltage Vss1 at which the pixels are turned on, point b corresponds to a first value Vss2 of the switching voltage, and point c corresponds to a second value Vss3 of the switching voltage. In the present embodiment, the first value Vss2 and the second value Vss3 are both greater than the minimum voltage Vss1 of the switching voltage.

Refer to FIG. 3, when the frequency switching is performed in the blank period 201, the switching voltage corresponding to the low frequency signal is set to be the minimum voltage Vss1 of the switching voltage, and at the same time, the switching voltage corresponding to the high frequency signal is set to be the first value Vss2 or the second value Vss3 of the switching voltage, thereby speeding up the electrical leakage of the thin film transistor T in the pixels, reducing the difference between the scan voltages V1 and V2 corresponding to the high and low frequencies respectively, and finally eliminating the problem of image flickering.

Preferably, in the embodiment of the present disclosure, when the display panel is switched between the high and low frequencies, in the blank period, that is, in the second stage, the value of the data voltage in the second stage of the low frequency signal is set to be greater than a corresponding value of data voltage in the first stage, the value of the switching voltage Vss of the pixels in the second stage of the low frequency signal is set to be greater than the minimum voltage Vss1 at which the pixels are turned on. At the same time, the value of the data voltage in the second stage of the high frequency signal is set to be less than a corresponding value of data voltage in the first stage, the value of the switching voltage Vss of the pixels in the second stage of the high frequency signal is set to be the minimum voltage Vss1 at which the pixels are turned on, the minimum voltage for turning on the pixels is Vss1, and the value of the switching voltage of the pixels in the second stage is Vss.

Specifically, as shown in FIG. 3, in the blank period 201, the value V3 of the data voltage corresponding to the low frequency signal is increased so that the value of the data voltage V3 is greater than the value V0 of the data voltage in the first stage 200, and adjusting the value of the switching voltage Vss corresponding to the low frequency signal to a level of the first value Vss2 or the second value Vss3 of the switching voltage, at this time, Vss2>Vss1, Vss3>Vss1. At the same time, in the blank period 201, the value V4 of the data voltage corresponding to the high frequency signal is decreased so that the value V4 of the data voltage is less than the corresponding value V0 of the data voltage in the first stage 200, and the switching voltage Vss of the pixels corresponding to the high frequency signal is set to the minimum voltage Vss1 at which the pixels are turned on, so that the switching voltage Vss corresponding to the high frequency signal is equal to the minimum voltage, Vss=Vss1. At this time, the thin film transistor corresponding to the pixels can be reversely charged, thereby ensuring a stability of the scan voltages V1 and V2, making the corresponding scan voltages V1 and V2 at different high and low frequencies have a smaller difference than before, thereby alleviating the flicker problem of the display panel.

At the same time, when adjusting the high frequency signal, the value of the data voltage of the corresponding high frequency signal in the blank period is reduced, so that the value V4 of the data voltage is less than the value V0. Synchronously, the value of the switching voltage Vss corresponding to the high frequency signal is adjusted to the minimum voltage Vss1. At this time, the stability of the scan voltage under high frequency can be effectively ensured, thereby reducing the difference between the scan voltages V1 and V2, and alleviating the flicker problem of the display panel.

In the present embodiment, the switching voltage VSS ranges from −25V to 25V. Preferably, the switching voltages Vss1, Vss2, Vss3, and the data voltages V3, V4 corresponding to the display panel can be adjusted and set according to the actual conditions of the display panel. Therefore, it is ensured that the display panel has high display quality and display effect.

The embodiment of the present disclosure also provides a display device. The display device includes the display panel according to the embodiments of the present disclosure. When the display panel is driven, the driving method in the embodiments of the present disclosure is configured to drive the display device. The display device can be applied to wearable devices, flat display devices, mobile devices, and other fields. When the display device performs high and low frequency switching, the image does not appear to flicker, and the displayed image has better display quality.

The driving method of the display panel and the display device according to the embodiments of the present disclosure are described in detail above. Specific embodiments are used to explain the principles and implementations of the present disclosure. The descriptions of the above embodiments are only used to help understand the technical solution of the present application and its core ideas. For a person skilled in the art, any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. A driving method of a display panel, wherein the display panel comprises:
- a plurality of scan lines;
- a plurality of data lines, wherein the data lines and the scan lines are disposed in an array in a display region of the display panel;
- a gate driving circuit electrically connected to the scan lines correspondingly, and disposed in a non-display region of the display panel; and
- a plurality of pixels disposed at intersections of each of the scan lines and each of the data lines, respectively;
- wherein when the display panel displays images, during a display period of a frame of image, when a displayed image of the display panel is subjected to frequency switching, a data voltage of the data lines or a switching voltage of the pixels is changed synchronously with the frequency switching of the displayed image;
- wherein during the display period of the frame of image, the display period of the frame of image comprises a first stage and a second stage, the first stage and the second stage are alternated in sequence, and a duration of the first stage is different from a duration of the second stage;
- wherein when the display panel is switched from a low frequency signal to a high frequency signal, a value of the data voltage is increased in the second stage, and the value of the data voltage in the second stage is greater than a corresponding value of the data voltage in the first stage, and wherein when the display panel is switched from the high frequency signal to the low frequency signal, the value of the data voltage is reduced in the second stage, and the value of the data voltage in the second stage is less than the corresponding value of the data voltage in the first stage.

2. The driving method of the display panel according to claim 1, wherein the first stage is a normal display stage of the display panel, the second stage is a blank period of the display panel, and the display panel does not display during the blank period.

3. The driving method of the display panel according to claim 1, wherein when a frequency of the displayed image is a high frequency signal or a low frequency signal, the duration of the second stage corresponding to the high frequency signal is less than the duration of the second stage corresponding to the low frequency signal.

4. The driving method of the display panel according to claim 1, wherein when the display panel is switched from a low frequency signal to a high frequency signal in the second stage, a minimum voltage at which the pixels are turned on is Vss1, a switching voltage of the pixels corresponding to the low frequency signal is Vss, a switching voltage of the pixels corresponding to the high frequency signal is Vss3, the switching voltage Vss of the pixels corresponding to the low frequency signal is set to the minimum voltage Vss1 at which the pixels are turned on, and the switching voltage Vss3 of the pixels corresponding to the high frequency signal is set to be greater than the minimum voltage Vss1 at which the pixels are turned on.

5. The driving method of the display panel according to claim 1, wherein when the displayed image of the display panel is subjected to the frequency switching, a value of the data voltage in the second stage of a low frequency signal is set to be greater than a corresponding value of the data voltage in the first stage, a value of the switching voltage Vss of the pixels in the second stage of the low frequency signal is set to be greater than a minimum voltage Vss1 at which the pixels are turned on; at the same time, a value of the data voltage in the second stage of a high frequency signal is set to be less than a corresponding value of the data voltage in the first stage, a value of the switching voltage Vss of the pixels in the second stage of the high frequency signal is set to be the minimum voltage Vss1 at which the pixels are turned on, the minimum voltage for turning on the pixels is Vss1, and the value of the switching voltage of the pixels in the second stage is Vss.

6. The driving method of the display panel according to claim 1, wherein a frequency of a scanning signal applied to each of the scan lines ranges from 10 Hz to 240 Hz.

7. A driving method of a display panel, wherein the display panel comprises:
- a plurality of scan lines;
- a plurality of data lines, wherein the data lines and the scan lines are disposed in an array in a display region of the display panel;
- a gate driving circuit electrically connected to the scan lines correspondingly, and disposed in a non-display region of the display panel; and
- a plurality of pixels disposed at intersections of each of the scan lines and each of the data lines, respectively;
- wherein when the display panel displays images, during a display period of a frame of image, when a displayed image of the display panel is subjected to frequency switching, a data voltage of the data lines or a switching voltage of the pixels is changed synchronously with the frequency switching of the displayed image;
- wherein during the display period of the frame of image, the display period of the frame of image comprises a first stage and a second stage, the first stage and the second stage are alternated in sequence;
- wherein when the display panel is switched from a low frequency signal to a high frequency signal in the second stage, a minimum voltage at which the pixels are turned on is Vss1, a switching voltage of the pixels corresponding to the low frequency signal is Vss, a switching voltage of the pixels corresponding to the high frequency signal is Vss3, the switching voltage Vss of the pixels corresponding to the low frequency signal is set to the minimum voltage Vss1 at which the pixels are turned on, and the switching voltage Vss3 of the pixels corresponding to the high frequency signal is set to be greater than the minimum voltage Vss1 at which the pixels are turned on.

8. The driving method of the display panel according to claim 7, wherein the first stage is a normal display stage of the display panel, the second stage is a blank period of the display panel, and the display panel does not display during the blank period.

9. The driving method of the display panel according to claim 7, wherein a duration of the first stage is different from a duration of the second stage.

10. The driving method of the display panel according to claim 7, wherein when a frequency of the displayed image is a high frequency signal or a low frequency signal, a duration of the second stage corresponding to the high frequency signal is less than a duration of the second stage corresponding to the low frequency signal.

11. The driving method of the display panel according to claim 7, wherein when the display panel is switched from a low frequency signal to a high frequency signal, a value of the data voltage is increased in the second stage, and the value of the data voltage in the second stage is greater than a corresponding value of the data voltage in the first stage, and wherein when the display panel is switched from the high frequency signal to the low frequency signal, the value of the data voltage is reduced in the second stage, and the value of the data voltage in the second stage is less than the corresponding value of the data voltage in the first stage.

12. The driving method of the display panel according to claim 7, wherein when the displayed image of the display panel is subjected to the frequency switching, a value of the data voltage in the second stage of a low frequency signal is set to be greater than a corresponding value of the data voltage in the first stage, a value of the switching voltage Vss of the pixels in the second stage of the low frequency signal is set to be greater than a minimum voltage Vss1 at which the pixels are turned on; at the same time, a value of the data voltage in the second stage of a high frequency signal is set to be less than a corresponding value of the data voltage in the first stage, a value of the switching voltage Vss of the pixels in the second stage of the high frequency signal is set to be the minimum voltage Vss1 at which the pixels are turned on, the minimum voltage for turning on the pixels is Vss1, and the value of the switching voltage of the pixels in the second stage is Vss.

13. The driving method of the display panel according to claim 7, wherein a frequency of a scanning signal applied to each of the scan lines ranges from 10 Hz to 240 Hz.

14. A display device, wherein the display device comprises a display panel, and the display panel comprises:

a plurality of scan lines;

a plurality of data lines, wherein the data lines and the scan lines are disposed in an array in a display region of the display panel;

a gate driving circuit electrically connected to the scan lines correspondingly, and disposed in a non-display region of the display panel; and a plurality of pixels disposed at intersections of each of the scan lines and each of the data lines, respectively;

wherein when the display panel displays images, during a display period of a frame of image, when a displayed image of the display panel is subjected to frequency switching, a data voltage of the data lines or a switching voltage of the pixels is changed synchronously with the frequency switching of the displayed image;

wherein during the display period of the frame of image, the display period of the frame of image comprises a first stage and a second stage, the first stage and the second stage are alternated in sequence; and wherein when the display panel is switched from a low frequency signal to a high frequency signal, a value of the data voltage is increased in the second stage, and the value of the data voltage in the second stage is greater than a corresponding value of the data voltage in the first stage, and wherein when the display panel is switched from the high frequency signal to the low frequency signal, the value of the data voltage is reduced in the second stage, and the value of the data voltage in the second stage is less than the corresponding value of the data voltage in the first stage.

15. The display device according to claim 14, wherein a frequency of a scanning signal applied to each of the scan lines ranges from 10 Hz to 240 Hz.

16. The display device according to claim 14, wherein the switching voltage of the pixels is set between −25V and 25V.

17. The display device according to claim 14, wherein the display device comprises a flat display device and a mobile display device.

* * * * *